United States Patent [19]
Srivastava

[11] Patent Number: 5,359,368
[45] Date of Patent: Oct. 25, 1994

[54] DEMODULATING A LINE LOCKED DIGITAL COLOR TELEVISION SIGNAL

[75] Inventor: Gopal K. Srivastava, Arlington Heights, Ill.

[73] Assignee: Zenith Electronics Corporation, Glenview, Ill.

[21] Appl. No.: 45,955

[22] Filed: Apr. 12, 1993

[51] Int. Cl.$^5$ .......................... H04N 9/65; H04N 9/66
[52] U.S. Cl. .................................. 348/641; 348/646; 348/649; 348/727
[58] Field of Search ........... 358/17, 19, 20, 23, 358/24, 28, 38; 348/641, 646, 649, 654, 727; H04N 9/65, 9/66

[56] References Cited

U.S. PATENT DOCUMENTS

| | | | |
|---|---|---|---|
| 4,612,568 | 9/1986 | den Hollander et al. | 358/19 |
| 4,625,232 | 11/1986 | Nillesen | 358/23 |
| 4,709,257 | 11/1987 | Suzuki | 358/23 |
| 4,799,102 | 1/1989 | Kobayashi | 358/23 |
| 5,025,310 | 6/1991 | Sekiya et al. | 358/19 |

FOREIGN PATENT DOCUMENTS 51387  3/1985  Japan .............................. H04N 9/67

*Primary Examiner*—James J. Groody
*Assistant Examiner*—Glenton B. Burgess

[57] ABSTRACT

A line locked digital color demodulator separates the V and U color components and the burst signal and uses a ROM for providing phase shifts to the V and U demodulation axes. During the burst time of an NTSC signal, the color component axes are shifted by 45° such that the burst signal produces equal components along the axes. A correction signal is developed in response to this shifting and is used in conjunction with a frequency error signal for continuously addressing the ROM. The error signal is developed by counting the number of clock pulses over a 16 line period and comparing the number counted with a standard number for the type signal being received. The error signal is combined with the correction signal for adjusting the phase of the V and U demodulation axes. For a PAL signal, the burst is normalized to always be at 135° and its components along the V and −U axes are compared as with the NTSC signal.

16 Claims, 5 Drawing Sheets

DEMODULATING A LINE LOCKED DIGITAL COLOR TELEVISION SIGNAL

BACKGROUND OF THE INVENTION AND PRIOR ART

This invention relates in general to digital television receivers and in particular to a demodulator for demodulating digital color television signals. In digital video processing systems, the analog video signal is generally digitized, i.e. converted to a digital signal, before signal processing to enable the employment of advanced video features. Commonly a color locked clock signal is used for controlling the analog-to-digital (A/D) converter used to sample the analog video signal. The color-locked clock signal is synchronized or locked to a color burst signal which is a multiple of the color subcarrier frequency Fsc in the National Television Standards Committee (NTSC) system. Another commonly used color system is referred to as the phase alternating line (PAL) system in which a particular relationship between the color or chroma subcarrier frequency and the horizontal scanning frequency is employed. The following equations represent those relationships:

| NTSC | 4Fsc = 910 × Fh, where Fh is the line frequency. |
| PAL | 4Fsc = 1135 × Fh + ¼ Fv, where Fv is the frame frequency. |

The digital video processing often requires the use of a delay element for delaying the sampled video signal by the equivalent of a horizontal line period. Where the relationship between the color subcarrier frequency and the horizontal or line scanning frequency is fixed, the line delay element may be constructed with an acceptable degree of precision. However, for monochrome video signals and other non-standard video signals, the relationship may not hold and video processing performance may be degraded. The advantage in A/D sampling, when the sampling clock is locked to color, is that the A/D converter samples the video at 90° intervals of the color signal and can therefore simplify the color demodulation function.

In a line-locked system, the line-locked clock signals are fixed to a harmonic of the horizontal sync frequency and the number of clocks in a line period is constant, irrespective of the horizontal scan frequency. In a line-locked system, the sampling clock of the A/D converter is locked to the line (Fh) and the accuracy of the delay element is independent of the line scan frequency. This yields a significant advantage when the system encounters signals with a non-standard relationship between the color subcarrier and horizontal scan frequency. The major difficulty in the line-locked color sampling system is that the horizontal frequency Fh may not bear the proper relationship to the color subcarrier frequency Fsc as described by the NTSC and PAL transmission standards. A simple color locked A/D converter for the color demodulation function may not operate properly with non-standard video signals. In particular, if the horizontal frequency differs from that established for either the NTSC or PAL system, a phase error $\theta_e$, which in the color-locked illustration is a constant, will continuously vary over the entire horizontal line. Thus a system for using a line-locked clock for a chroma A/D converter will require a color demodulator for continuously correcting each pair of U and V color component data for the continuously varying phase error $\theta_e$.

The present invention discloses a practical color demodulation system for a digitized line-locked color signal.

OBJECTS OF THE INVENTION

A principal object of the invention is to provide a novel color demodulation system for a digital color signal.

Another object of the invention is to provide a line-locked color demodulation system for a television receiver.

A further object of the invention is to provide a digital color demodulation system for a television receiver.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
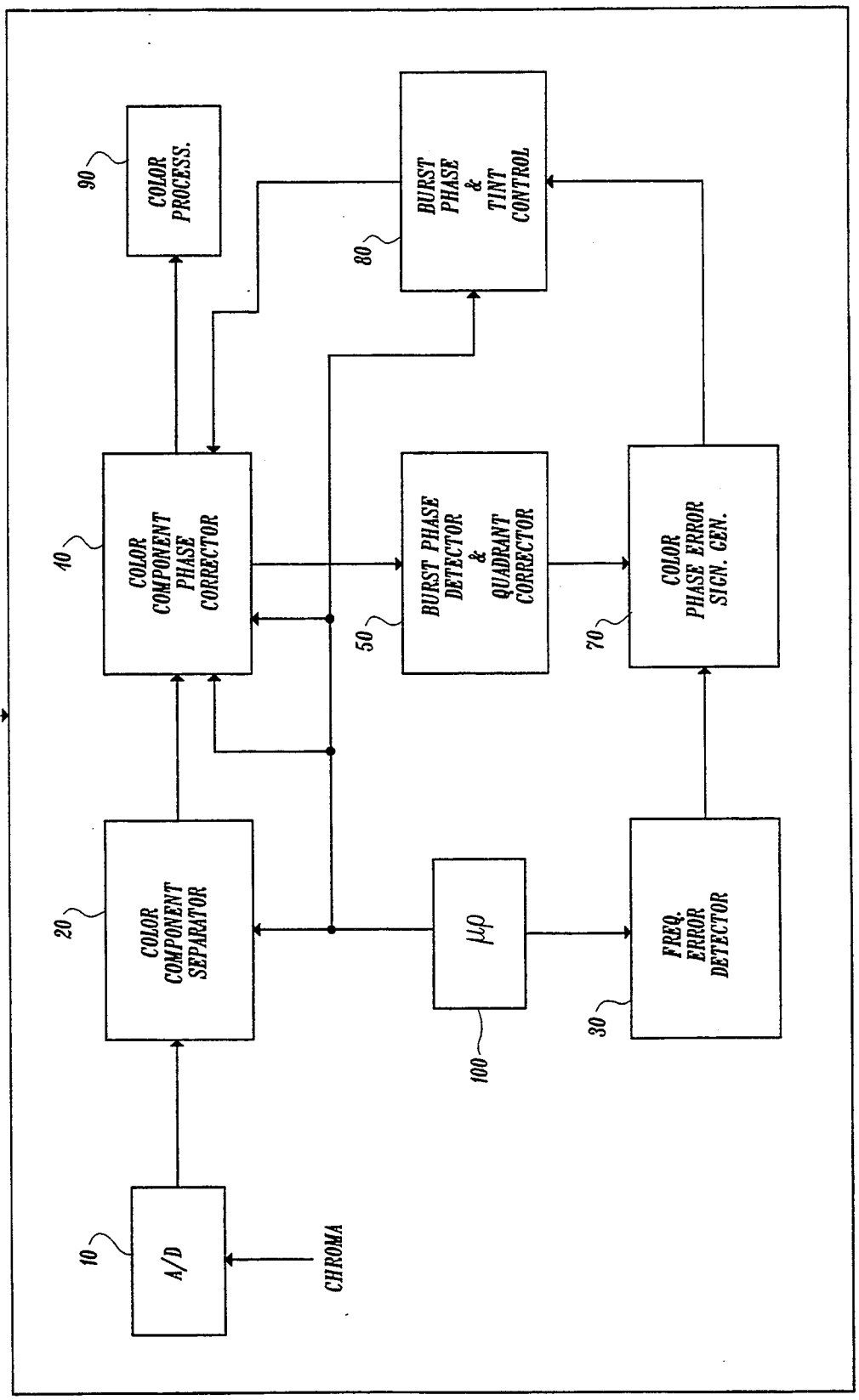
FIG. 1 is a simplified block diagram of a television receiver showing the major components of the invention.

Referring to FIG. 1 the components of the invention are indicated as being part of a television receiver, with only the essential aspects thereof being illustrated. A chroma signal is supplied to an A/D converter 10 where it is digitized and applied to a color component separator 20. Color component separator 20 is coupled to a color component phase corrector 40 that in turn supplies an output to a burst phase detector and quadrant corrector circuit 50. The output of the burst phase detector is applied to a color phase error signal generator 70 that is also supplied from a frequency error detector circuit 30. A burst phase and tint control circuit 80 receives the output of the color phase error signal generator 70 and supplies an input to the color component phase corrector 40. The output of the color component phase corrector 40 is supplied to a color processing circuit 90. A microprocessor 100 is intercoupled with the various elements for controlling their timing and for supplying appropriate coefficients. The operation of the circuit of FIG. 1 is self-explanatory with reference to the titles of the various blocks.

Figure 2A:
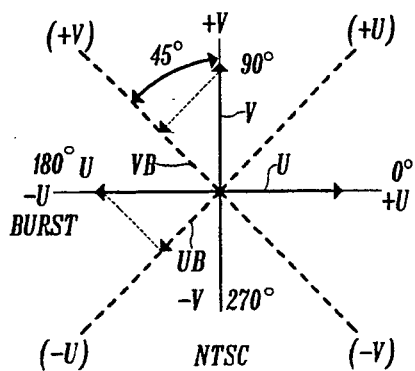
FIGS. 2A and 2B are phasor diagrams of NTSC and PAL chroma signals illustrating operation of the invention.
Figure 2B:
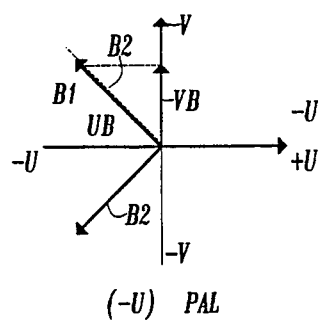

To more fully appreciate the technique of developing the proper color component phase corrections, FIGS. 2a and 2b are phasor diagrams of V and U color component demodulation axes, V and U color components and reference burst signals B, B1 and B2 in an NTSC and a PAL color system, respectively. The V and U color component axes are situated at 90° (orthogonally related) with respect to each other. In the NTSC system of FIG. 2A, the burst signal B is directed oppositely to the +U color axis and is 90° with respect to the +V component and −180° with respect to the +U component. In the NTSC system, the relationship between the burst B and the color components V and U does not change from line to line. In the PAL system illustrated in FIG. 2B, however, the relationship between the U and the V components is fixed at 90° but the burst signal changes every line from a 135° to a 225° relationship with respect to the +U component. This is illustrated by the burst vectors B1 and B2. With respect to an NTSC signal, the invention shifts or adjusts the color demodulation axes with respect to burst during the burst interval, and is illustrated by the dashed lines in FIG. 2A. The color demodulation axes (+V) and (+U) are seen to have been shifted 45° with respect to the burst signal B. This shift occurs during the burst interval and enables the development of burst signal components along the (+V) and (−U) axes that are equal when the proper relationship exists between the incoming color components and the demodulation axes. (Under normal circumstances, the burst component B develops a zero component along the +V axis and a maximum component along the −U axis.) The shifting of the demodulation axes enables two burst components (VB and UB) to be compared for developing a burst error signal.

In the PAL arrangement, the burst signal changes every other line from 135° to 225°. In the invention, the burst is normalized, i.e. the negative burst at 225° is made positive at 135° so that burst components along the +V and −U axes may be developed and compared as in the case of the NTSC signals described above. The invention thus provides a very attractive implementation of a line-locked color demodulator that is equally useful with NTSC and PAL color signals. To summarize, the invention teaches developing burst signal components along the V and U demodulation axes which are equal when the burst is properly orientated to the color component demodulation axes.

As will be seen, a correction signal having two components is developed for addressing a ROM to adjust the color demodulation axes and effect phase correction. One correction signal component comprises a frequency error related to a difference in line frequency between the incoming signal and a standard and represents addressing a ROM at a constant rate, and is called static correction. The other component comprises a phase error related to the relationship of the burst signal to the color demodulation axes and represents addressing a ROM at a dynamic rate, and is called dynamic correction. The color component phase corrector is controlled by the appropriate digital values from the ROM in response to its being addressed by the correction signal.

Figure 3:
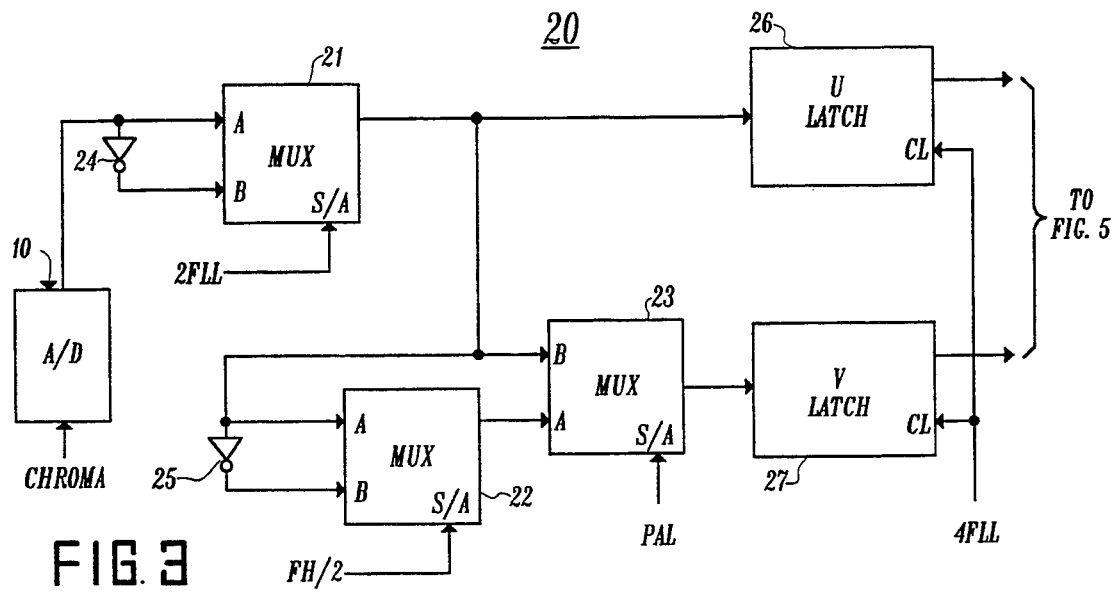
FIG. 3 is a detailed block diagram of the color component separator of FIG. 1.

FIG. 3 represents the color component separator and the output of A/D converter 10 is a serial stream of U and V color signal samples. The A/D sampling is at 4FLL which, in the NTSC system, equals 910 Fh (horizontal line frequency) and in the PAL system equals 1135 Fh. The color signal from the comb filter (not shown) in the receiver produces chroma output samples having the following sequence:

[U(0°+$\theta_e$)], [V(90°+$\theta_e$)], [U(180°+$\theta_e$)],
[V(270°+$\theta_e$)], [U(360°+$\theta_e$)] etc.

These samples are applied to the A input of a multiplexer 21 and through an inverter 24 to the B input of multiplexer 21. A 2FLL (two times the line-locked frequency) timing signal is applied to the select input of multiplexer 21, indicated as SA. SA means that the signal at the A input of the multiplexer is selected in response to the 2FLL timing signal. At other times, the B input is selected as the multiplexer output. The output of multiplexer 21 is applied to a U latch 26, to the A input, and through an inverter 25 to the B input, of a multiplexer 22, and to the B input of a multiplexer 23. The signal applied to the A input of multiplexer 22 is selected by the Fh/2 signal at its select terminal and is applied to its output. The output of multiplexer 22 is supplied to the A input of multiplexer 23 which has an appropriate signal applied to its select input (for selecting input A as its output) in the event a PAL signal is being processed. The output of multiplexer 23 is applied to a V latch 27. Both U latch 26 and V latch 27 are clocked by a 4FLL clock signal with the positive edge of the signal clocking the U latch 26 and the negative edge of the signal clocking the V latch 27. The arrangement of the 2FLL signal, the Fh/2 signal and the 4FLL clock results in the U components from A/D converter 10 being applied to the U latch 26 and the V components being applied to the V latch 27. These components are all of the same polarity because of the operation of the inverters and the switching signals. The arrangement also normalizes the burst signal in a PAL system by making the V component thereof always positive. The net effect for PAL signals is that the burst is at 135° for every line.

Figure 4:
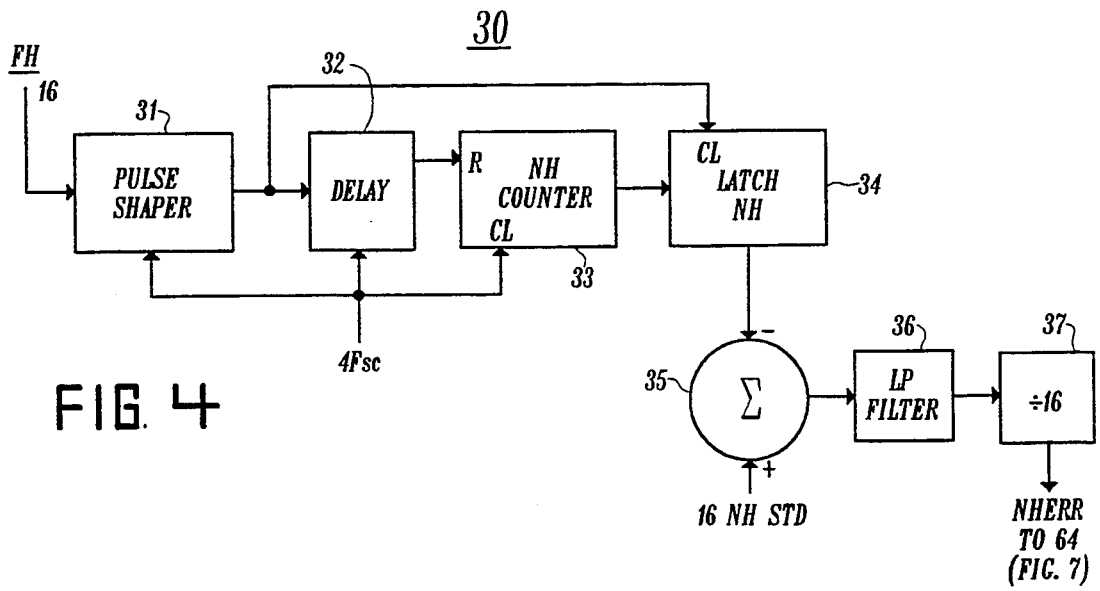
FIG. 4 is a detailed block diagram of the frequency error detector of FIG. 1.

The frequency error detector circuit in FIG. 4 operates to count the number of 4Fsc clock pulses that occur in a given period, i.e. over a fixed number of horizontal lines. In the preferred embodiment, the number of horizontal lines is 16. The input timing signal Fh/16 indicates that a counting period covering 16 horizontal lines is used. A pulse shaper 31, in conjunction with the FH/16 signal input and a 4Fsc signal input (four times the color subcarrier frequency) develops a window signal that is coupled to the clock input of the latch 34 and to the input of a delay circuit 32. The delay circuit produces a start pulse that is applied to the reset input of a counter 33 that has its clock input driven by the 4Fsc signal. As indicated, counter 33 counts the number of 4Fsc clock pulses occurring during a 16 line period and is called 16NH. The output of counter 33 is applied to latch 34 where the 16NH count is latched for each 16 line period. The output of latch 34 is applied to the negative input of a summer 35 which has its positive input supplied with a standard 16 NH count for that 16 horizontal line period. With a crystal voltage controlled oscillator generating a 4Fsc frequency of 14.312 MHz, the standard 16NH count for an NTSC signal is 16×910=14.31813 MHz and for a PAL is 16×1135=17.7344 MHz. The output of summer 35, which is a subtraction of the measured or counted number 16NH, and the standard number of 16NH is applied to a low pass filter 36 that in turn supplies a 1/16 divider 37 which produces a horizontal frequency error signal NHERR. In the preferred embodiment, the NHERR signal is a 9 bit number. The selection of a timing period that covers a number of horizontal lines will be seen to improve the resolution of the system in developing an error signal NHERR.

Figure 5:
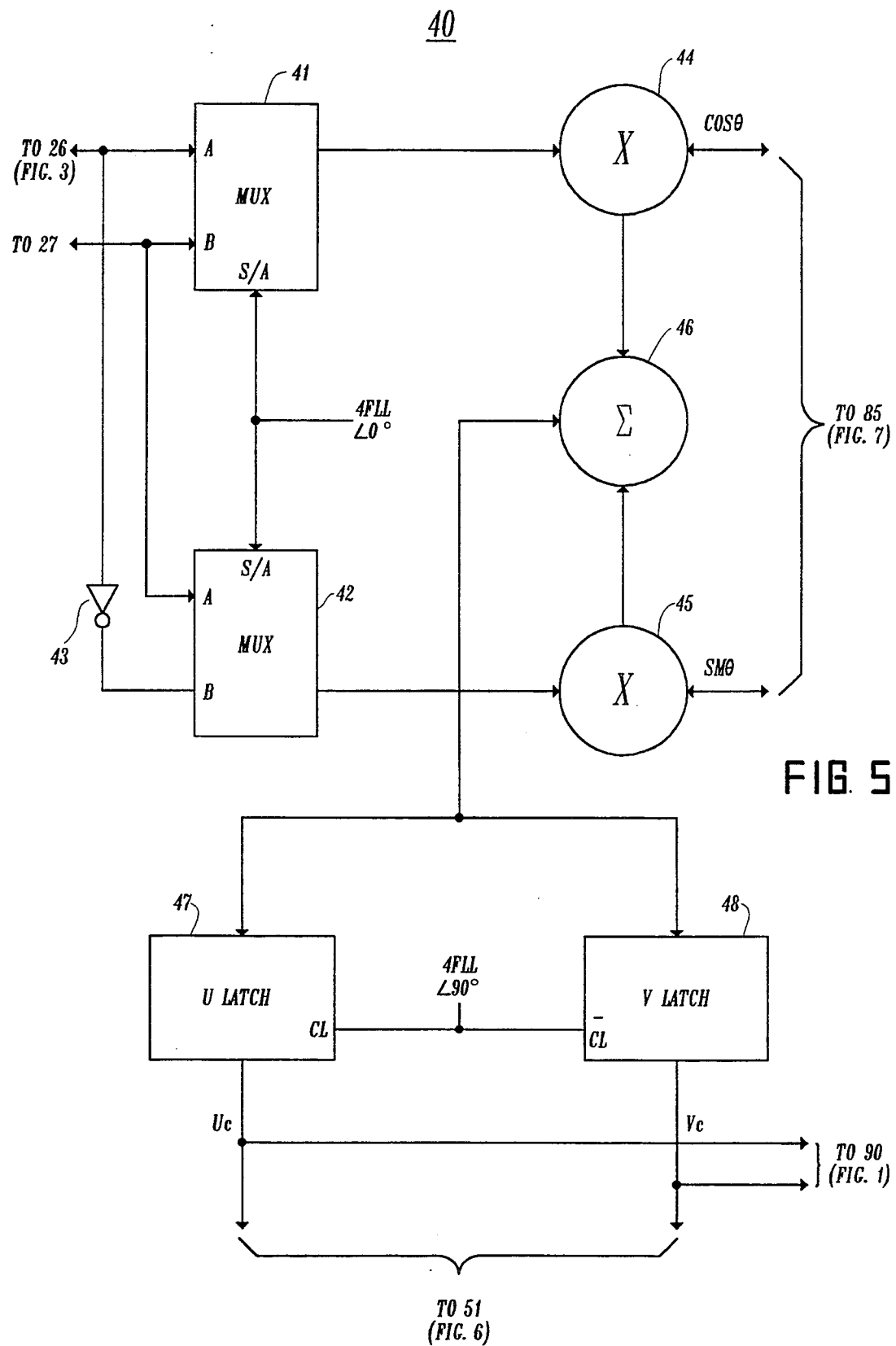
FIG. 5 is a detailed block diagram of the color component phase corrector of FIG. 1.

In FIG. 5, the U and V signals from the latches 26 and 27 (FIG. 3) are applied to respective A and B inputs of a multiplexer 41. The U signal is also applied through an inverter 43 to the B input of a multiplexer 42 and the V signal is applied to the A input of multiplexer 42. Multiplexers 41 and 42 have their A inputs selected by a 4FLL signal (at a phase angle of 0°) applied thereto as indicated. The output of multiplexer 41 is supplied to the input of a multiplier 44 and the output of multiplexer 42 is applied to the input of a multiplier 45. The other inputs of the multipliers 44 and 45, identified as cos $\theta$ and sin $\theta$, respectively, are received from a ROM 85 (FIG. 7) as will be described. The outputs of multipliers 44 and 45 are applied to a summer 46, the output of which is applied to a U latch 47 and to a V latch 48 that are clocked, respectively, by the positive and negative 4FLL signal (at a phase angle of 90°) for timing purposes. The outputs of the U latch and the V latch comprise the corrected $U_c$ component and the corrected $V_c$ component which are applied to color processor 90 (FIG. 1) and to a burst latch 51 in FIG. 6.

Figure 6:
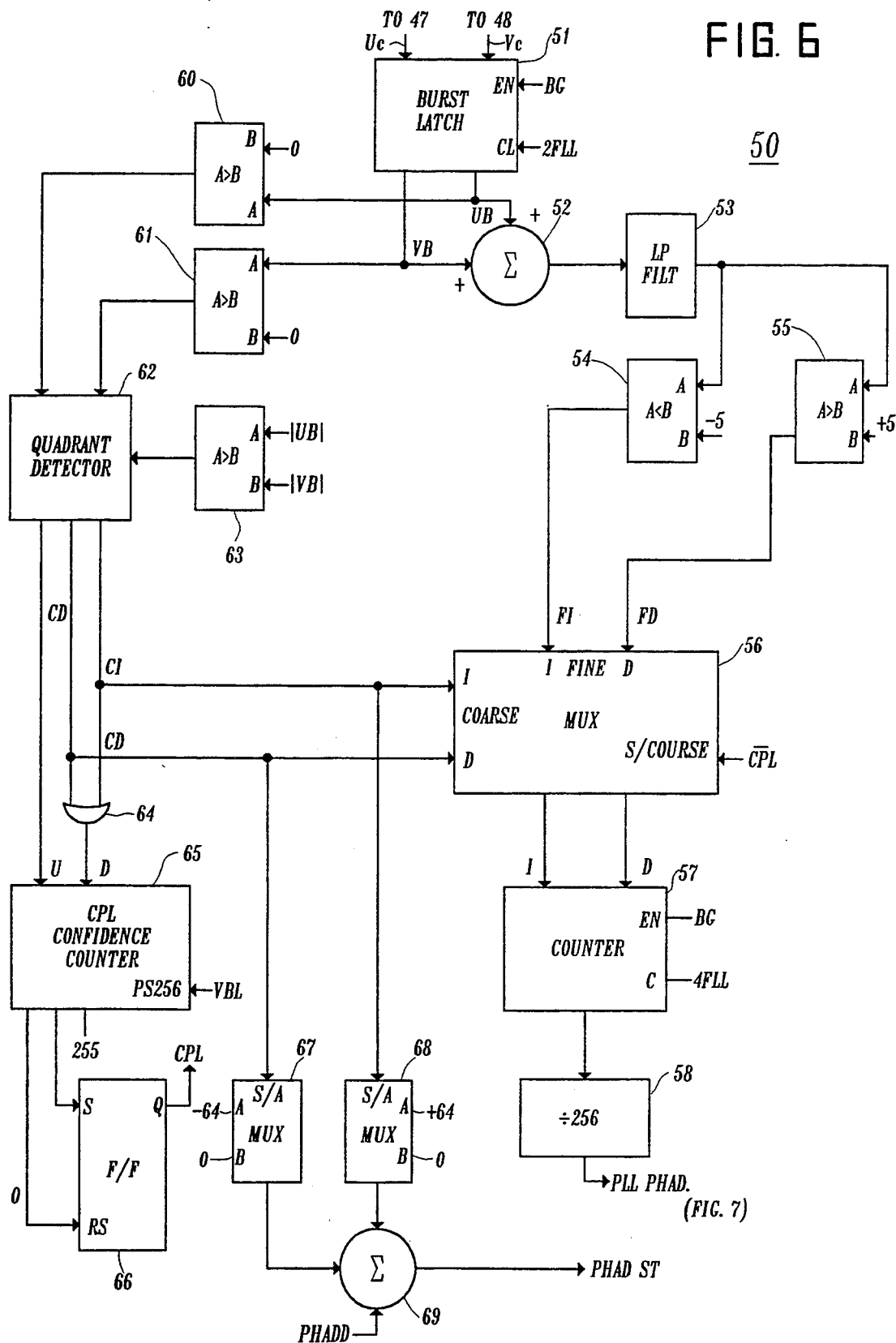
FIG. 6 is a detailed block diagram of the burst phase detector and quadrant corrector of FIG. 1.

Referring to FIG. 6, burst latch 51 receives the $U_c$ and $V_c$ inputs from latches 47 and 48, respectively, of FIG. 5. It also has a burst gate signal BG applied to its enable input and a 2FLL clock signal applied to its clock input. The signal outputs, labelled VB and UB, are active during the burst signal gate interval and represent a V component of the burst signal and the U component of the burst signal during the burst gate interval.

The UB signal is applied to the A input of a comparator 60 and the VB component is applied to the A input of a comparator 61. The B inputs of comparators 60 and 61 are coupled to a 0 input and therefore the comparators simply determine whether the UB and VB signals are positive. The appropriate ones of the outputs of comparators 60 and 61 are applied to a quadrant detector 62 which also has an input from a comparator 63 that is supplied with the absolute values (magnitude without regard to polarity) of the UB and VB signals. These absolute values are indicated by the vertical parallel lines | |. The quadrant detector determines in which quadrant the burst components UB and VB appear to enable a course (large) correction to be made to the color component phase corrector circuit color demodulation axes. The following table indicates the operation of quadrant detector 62.

| Quadrant | UB | VB | Course Error Signal | Other Condition |
|---|---|---|---|---|
| First | + | + | Decrease | — |
| Second | — | + | Correct | — |
| Third | — | — | Increase | — |
| Fourth (Upper) | + | — | Decrease | |UB| > |VB| |
| Fourth (Lower) | + | — | Increase | |UB| < |VB| |

There are three outputs of quadrant detector 62, a CI (course increase), a CD (course decrease) and a CORR that indicates that the burst signal has been found in the second quadrant (the correct quadrant for both the NTSC and the normalized PAL signal). The CD and CI outputs are coupled through an OR gate 64 to the D (down) input of a color phase lock (CPL) confidence counter 65. The correct input signal CORR is applied to the U (up) input of counter 65. Counter 65 is supplied with a preset number, which in the preferred embodiment is 128, each time a vertical blanking (VBL) pulse is received from the television circuitry (not shown). This is indicated as a VBL input. The clock input of the counter 65 is supplied with the burst gate signal BG. The outputs of counter 65 are 0 and 255 and are applied respectively to the RS and S inputs of a flip/flop 66 with the Q output of flip/flop 66 developing the CPL signal, or flag, which indicates a color phase locked condition. The confidence counter 65 precludes rapid changes and assures that the burst signal is in the proper quadrant for a significant amount of time before a color phase locked condition is indicated. On the other hand, the confidence counter is counted down when the burst phase is not found in the second quarter and it takes a run of 128 such counts before the CPL flag is negated. The course CI and CD signals are applied to the I (increase) and D (decrease) inputs of a multiplexer 56 which is also provided with fine input signals FI and FD (fine increase and fine decrease) from a burst phase detector arrangement.

The VB and UB burst components are also applied to a summer 52, the output of which is coupled to a low pass filter 53 and provided to the A inputs of a pair of comparators 54 and 55. The B inputs of the comparators are applied to signals representing −5 and +5, so that the output of LP filter 53 must be greater than +5 or smaller than −5 to generate correction signals FI and FD, respectively. The output of comparator 54 constitutes the fine increase (FI) signal and the output of comparator 55 constituted the fine decrease (FD) signal. The negative color lock flag $\overline{CPL}$ selects the course I and D inputs of MUX 56 (and thus the CI and CD signals) for coupling to its outputs and the positive CPL flag results in the fine input signals FI and FD being coupled to the output of MUX 56. The I and the D outputs of MUX 56 are applied to a counter 57 which is enabled by the burst gate signal BG and clocked by the 4FLL signal. The counter 57 output is supplied to a divider 58 which divides by 256 and produces a PLL PHAD signal which is the dynamic correction component of the correction signal that is used to address the ROM.

The course increase CI and course decrease CD signals are also applied to a pair of multiplexers 67 and 68. The A inputs of the multiplexers are coupled to inputs of −64 and +64 counts and the B inputs are connected to inputs representing a 0 count. In the presence of a CI or a CD signal, the A input of the respective multiplexer is selected which provides either a −64 or a +64 as its output. The outputs of the multiplexers are applied to a summer 69 along with the PHADD signal (to be described), the output of which provides the PHAD ST (start) signal. This start signal is developed during the burst gate interval when the CD or CI signals are present and gives a fast shift to the demodulation axes to speed up the acquisition process, that is the time to achieve a color phase locked condition. The 64 count represents a 45° phase shift to the color phase corrector. It will be seen that these signals are latched and are therefore cumulative so that the process needn't be repeated for each cycle of the television signal.

Figure 7:
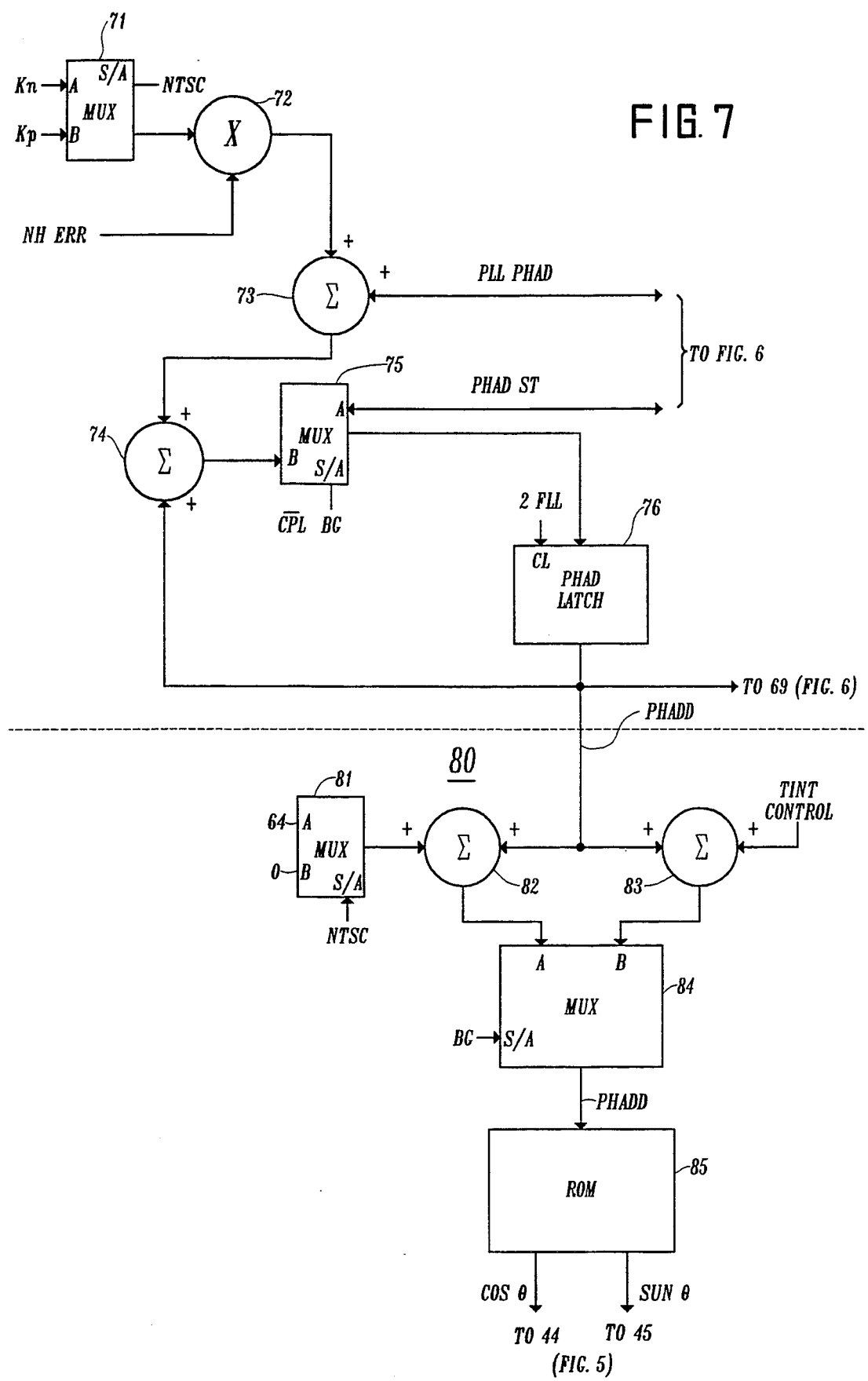
FIG. 7 is a detailed block diagram of the phase error signal generator and burst phase and tint control circuit of FIG. 1.

In FIG. 7, the circuitry for combining the frequency error signal and the phase error signal (including the start signal) and for applying them to address the ROM is shown. A multiplexer 71 has an A input provided with a constant Kn (NTSC) and a B input provided with a constant Kp (PAL). Its output is applied to a multiplier 72 which also receives an input of the NHERR signal developed by the frequency error detector circuit 30 in FIG. 4. The constant K represents the phase angle (in degrees) divided by the PHADD input, multiplied by $\theta$ divided by the NHERR per line input, and divided by the number of UV pairs per line. The ROM has 512 addresses and covers 360° of phase rotation and therefore its resolution, which is the total number of degrees (360°) divided by the PHADD correction signal, equals 0.703° per address change. Therefore, the term degrees-divided-by-PHADD equals 0.703. If the quantity NHERR is equal to 1, there will be a phase shift of 90° at the end of one line and therefore the $\theta$/NHERR per line equals 90°. For an NTSC signal, the number of UV pairs per line is 455 and for PAL it is 567.5. Therefore, Kn is equal to 0.1391 and Kp is equal to 0.1115.

The output of multiplier 72 is applied to a summer 73 which also receives the PLL PHAD phase error signal as an input. The output of summer 73 is applied to another summer 74, the output of which is applied to the B input of a multiplexer 75. Multiplexer 75 has its A input supplied with the PHAD ST input signal and its select input is coupled to the combined $\overline{\text{CPL}}$ flag and burst signal BG. The PHAD ST input is selected during a burst gate provided the CPL flag is negative meaning that color phase lock has not yet been attained. This provides the number 64 (representing a phase shift of 45°) to the output of multiplexer 75 which is coupled to the PHAD latch 76. The output of latch 76 is also supplied back to summer 74 so that the phase shift desired is cumulative, i.e. remembered from cycle to cycle. Should a fast change of the address pointer for the ROM be needed, the 64 count provided by the PHAD ST signal is remembered and reapplied to the D input of the MUX and becomes a bias or base for subsequent correction signals for addressing the ROM. Consequently, if it is determined that a major phase shift is required to properly orient the demodulation axes with respect to the incoming burst signal, the phase shift is cumulative and remembered for succeeding cycles of the process. It will also be appreciated that if the demodulation axes need to be adjusted by an angle such as 50°, that adjustment is required for each cycle of the incoming signal. Consequently, all of the adjustments, i.e. start, course and fine, are remembered and applied to each line.

The output of latch 76 is applied to a pair of summers 82 and 83 for providing a tint control and a 45° offset (during burst time) for NTSC signals. Multiplexer 81 has its A input coupled to a 64 count and its B input to a 0 count and has its A input selected in the presence of an NTSC signal. The 64 count provided to the output of multiplexer 81 represents a 45° phase shift in the V and U demodulation axes and is a preset for NTSC signals. The output of multiplexer 81 is coupled to summer 82, the output of which is applied to the A input of multiplexer 84. The output of summer 83 is applied to the B input of multiplexer 84 and its other input is supplied from a tint control (not shown). The tint control is a conventional user control for adjusting the phase to adjust the color tint to the preferences of the viewer. Multiplexer 84 has its A terminal selected by the burst gate signal. Therefore, during the burst time period, the 64 count preset from multiplexer 81 is applied to the address pointer of ROM 85 to cause a 45° shift in the V and U demodulation axes to enable the evaluation of the relationship of the incoming burst signal with respect to that which represents the correct phase relationship in the signal. As was seen, this is determined by the V burst component VB being equal to the −U burst component UB. During non-burst time periods, the output of multiplexer 84 is its B input which is the PHADD correction signal as described plus any additional digital number from the tint control.

To recapitulate, for an NTSC signal, the system introduces a phase shift in the demodulation axes during the burst interval so that the burst components along those axes may be compared with each other to determine whether the burst has the proper phase relationship to the unshifted demodulation axes. As discussed, during a PAL signal, the normalization results in the burst signal being at 135° and forming equal magnitude burst components VB and UB along the V and U axes.

The output of MUX 84 is applied to ROM 85. As mentioned previously, ROM 85 has a table of 512 addresses that cover 360° of phase change. Its output represents cosine $\theta$ and sine $\theta$ for each of the addressed positions. The relationship of the output signals $U_c$ and $V_c$ of color component phase corrector 40 is as follows:

$$U_c = U \cos \theta + V \sin \theta \text{ and } V_c = V \cos \theta - U \sin \theta$$

It will be appreciated that the ROM table is addressed continually during each signal cycle since digital phase correction must be continuously applied across the horizontal line.

What has been described is a novel digital color demodulation system useful with a line locked color television receiver. It is recognized that numerous changes in the described embodiment of the invention will be apparent to those skilled in the art without departing from its true spirit and scope. The invention is to be limited only as defined in the claims.

What is claimed is:

1. A method of demodulating a line locked digital color television signal including orthogonally related V and U color components and a reference burst signal bearing a known phase relationship to the V and U color components:
   developing components of the burst signal VB and UB along the V and U axes;
   generating a correction signal as a function of the difference between VB and UB, said difference being zero when the magnitudes of −UB and +VB are equal;
   measuring the number of clock pulses occurring in a given period extending over a plurality of lines of video in said color television signal;
   comparing the measured number of clock pulses with a standard number;
   producing a frequency error component for said correction signal based upon the comparison; and
   using the correction signal to adjust the V and U axes.

2. The method of claim 1, further comprising:
   storing, in a ROM, adjustment values for adjusting the phases of the V and U axes; and
   addressing the ROM with said correction signal.

3. The method of claim 2 wherein each ROM address represents a given phase angle change in said V and U axes and wherein said correction signal is cumulative in addressing said ROM.

4. The method of claim 3 wherein said developing comprises phase shifting the V and U axes by 45° during occurrence of the burst signal.

5. A method of demodulating a line locked digital color television signal including orthogonally related V and U color components and a reference burst signal bearing a known phase relationship to the V and U components comprising:

developing burst components VB and UB along the V and U axes;

generating a correction signal as a function of the difference in magnitude of VB and UB;

measuring the number of clock pulses occurring in a period extending over a plurality of lines of video of said television signal;

producing a frequency error correction component for said correction signal based upon the difference between the measured number of clock pulses and a standard number of clock pulses for said period; and addressing a ROM with said correction signal for adjusting the phase of the V and U axes.

6. The method of claim 5 wherein said generating comprises developing a course correction component for said correction signal when said VB and UB components are not in the second quadrant and developing a fine correction component for said correction signal when a color lock condition is attained, all of said correction components being cumulative.

7. The method of claim 6 further including adding a tint correction component to said correction signal for user adjustment of the U and V axis.

8. The method of claim 7 wherein said developing comprises phase shifting the V and U axes by 45° during occurrence of the burst signal.

9. A color demodulator for a television signal receiver comprising:

means for developing a digitized color signal;

means for separating said digitized color signal into orthogonally related V and U color components and a burst signal, said burst signal bearing a known phase relationship to said color components;

means for developing components of said burst signal along the axes of said V and U color components;

means for counting the number of clock pulses occurring in a fixed number of video lines of said television signal;

means for comparing the counted number of clock pulses with a standard number and for developing a frequency error correction component therefrom;

means for developing a correction signal for adjusting said color demodulator based upon the magnitudes of said developed burst signal components; and means for adding said frequency error correction component to said correction signal.

10. The demodulator of claim 9 further including means for counting the number of clock pulses occurring in a fixed number of video lines of said television signal;

means for comparing the counted number of clock pulses with a standard number and for developing a frequency error correction component therefrom; and means for adding said frequency error correction component to said correction signal.

11. The demodulator of claim 9 further including a ROM storing values for incrementally adjusting the phase angle of said V and U color component axes; and means for addressing said ROM with said correction signal.

12. The demodulator of claim 11 wherein said correction signal developing means comprises:

quadrant detection means for developing a course correction component for said correction signal when said burst signal components are not in the second quadrant; and filter means for developing a fine correction component for said correction signal when color lock has been attained, all of said correction components of said correction signal being cumulative.

13. The demodulator of claim 12 further including means for adding a tint correction component to said correction signal for user adjustment of said V and U color axes.

14. The demodulator of claim 13 wherein said means for developing components of said burst signal shift the axes of said U and V color components by 45° during occurrence of said burst signal.

15. A color demodulator for a television signal receiver comprising:

means for developing a digitized color signal;

means for separating said digitized color signal into orthogonally related V and U color components and a burst signal, said burst signal bearing a known phase relationship to said color components;

means for developing components of said burst signal along the axes of said V and U color components;

a ROM storing values for incrementally adjusting the phase angle of said V and U color component axes;

means for addressing said ROM with a correction signal; and means for developing said correction signal for adjusting said color demodulator based upon the magnitudes of said developed burst signal components including;

means for counting the number of clock pulses occurring in a fixed number of video lines of said television signal;

means for comparing the counted number of clock pulses with a standard number and for developing a frequency error correction component therefrom;

means for adding said frequency error correction component to said correction signal;

quadrant detection means for developing a course correction component for said correction signal when said burst signal components are not in the second quadrant;

filter means for developing a fine correction component for said correction signal when color lock has been attained, all of said correction components of said correction signal being cumulative; and means for adding a tint correction component to said correction signal for user adjustment of said V and U color axes.

16. The demodulator of claim 15 wherein said means for developing components of said burst signal shift the axes of said U and V color components by 45° during occurrence of said burst signal.

* * * * *